Aug. 5, 1924.

H. S. DICKINSON 1,504,104

DRAFT CONTROL FOR DOUBLE CUT DISK HARROWS

Filed Oct. 25, 1920      3 Sheets-Sheet 3

INVENTOR
Harry S. Dickinson
ATTORNEY.

Patented Aug. 5, 1924.

1,504,104

UNITED STATES PATENT OFFICE.

HARRY S. DICKINSON, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

DRAFT CONTROL FOR DOUBLE-CUT DISK HARROWS.

Application filed October 25, 1920. Serial No. 419,236.

*To all whom it may concern:*

Be it known that HARRY S. DICKINSON, a citizen of the United States, residing at Moline, county of Rock Island, State of Illinois, has invented certain new and useful Improvements in Draft Controls for Double-Cut Disk Harrows, of which the following is a specification.

The invention relates to tandem disk harrows.

It relates particularly to means for connecting the disk gangs so that the rear pair will properly trail the front pair both in advancing and in turning and so that at the same time, proper flexibility will be maintained between the two sets of gangs.

Tandem disk harrows usually include a front pair of disk gangs which are trailed by a rear pair of gangs. It is desirable to have the rear pair of gangs follow the front pair so that the rear disks cut the ground between the furrows left by the disks of the front pair. This may be fairly satisfactorily secured by using a rigid frame and mounting all four gangs in proper relation to the frame. However, such a construction makes a harrow rather inflexible and prevents free adjustment of the harrow to inequalities in the surface of the ground. If the harrow is moving over a sharp rise, it is desirable to have the rear set of gangs move about a horizontal transverse axis relative to the front pair. It may also be necessary in moving forward over varying slopes to have the rear pair of gangs move relative to the front pair about a horizontal, longitudinal axis. Furthermore, when turning, if the gangs do not trail properly they will have to be moved sideways to the ground which requires considerable draft and also cuts up the ground in an undesirable manner.

Attempts have been made to solve this problem by eliminating the rigid frame and simply connecting the rear set of gangs by a flexible connection to the front set. This permits movement about longitudinal and transverse horizontal axes to give the requisite flexibility but there is nothing to keep the rear pair of gangs in proper alignment with the front pair. It is asumed that the natural position that the rear set of gangs will occupy when being pulled forward is sufficiently accurate. This is not true when the harrow is turned, but it is considered by some that this defect is not as pronounced as the difficulties that are encountered when a rigid frame is employed.

The present invention has been devised for the purpose of securing the requisite flexibility between different sets of gangs and at the same time positively causing the rear pair of gangs to trail the front set both when advancing and when turning.

The general object of the invention is to provide an improved tandem disk harrow construction.

A more specific object is to provide an improved draft control connection between the sets of gangs of the tandem disk harrow to cause the gangs to trail in proper relation both when advancing and when turning.

Other objects and advantages of the invention will appear from the specification and drawings. An embodiment of the invention is illustrated in the drawings in which—

Figure 1:
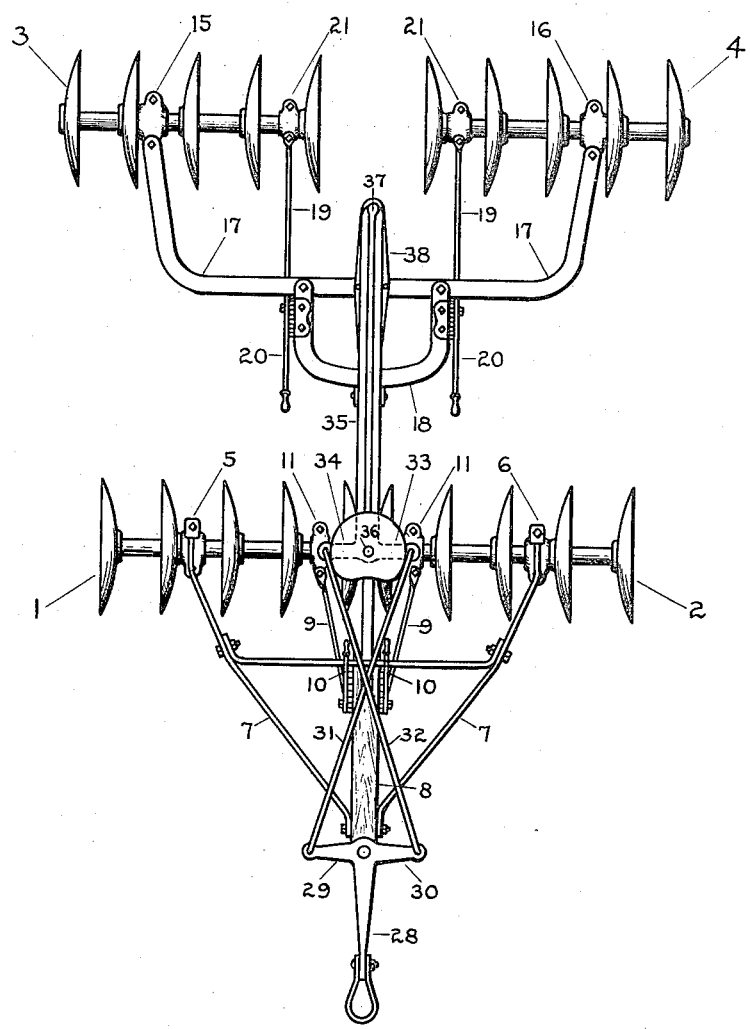
Figure 1 is a plan view of the harrow with the gangs in transport position and with the harrow moving straight ahead.

The harrow comprises a front pair of gangs 1 and 2 and a rear pair of gangs 3 and 4. The gangs of the front pair pivot on bearings 5 and 6 respectively, carried by the draft frame 7, coupled to the draft tongue 8. The gangs are angled by means of links 9 controlled by levers 10, mounted on the draft tongue 8. The links 9 are connected to bearings 11 supporting the inner ends of the gang. The gangs may be moved to and from the transport position and adjusted at any desired working angle by means of the lever 10. Other forms of mechanisms for angling the gangs may also be used.

The gangs of the rear pair are pivoted on bearings 15 and 16 respectively, carried by frame 17 having a U-shaped extension 18. The gangs are angled by means of links 19 controlled by levers 20 mounted on the frame. The links 19 are connected to bearings 21 on the inner ends of the rear pair of gangs. The gangs may be adjusted to their form of working position and to any desired working angle by manipulation of the levers 20.

The connections and the mechanism for causing the rear pair of gangs to trail the front pair is as follows:

The draft tongue 8 has a rearward extension 25, slidably mounted in a bearing 26 swiveled on a bracket 27 carried by the frame 18 of the rear pair of gangs. Pivoted to the front end of the tongue 8 is a draft connection 28 having two arms 29 and 30 connected by cross links 31 and 32 to arms 33 and 34 of link 35 pivoted to the tongue at 36 and extending rearwardly, and pivoted at 37 to a member 38 fixed to the frame 17 of the rear pair of gangs. The pivot 36 and the swivel member 25 are sufficiently loose to permit the rear pair of gangs to have a slight movement relative to the front set about longitudinal and about transverse horizontal axes. The link 35 is provided with a roller 39 contacting the under face of the angle iron forming a portion of the frame 17.

When the harrow is being pulled straight forward, the draft is transmitted to the draft tongue 8 and the frame 7 to the front pair of gangs and to the tongue 8, the link 35 and the frame 17 to the rear pair of gangs. The draft is transmitted in this whether the gangs are in transport position or in any working angle. If there is a tendency for the rear pair of gangs to slew or move to one side, such action is prevented because, in order to so move, the rear pair of gangs would have to move about either the pivot 36 or the pivot 37 but movement about pivot 36 is prevented by reason of the cross link connected to the draft member 28 which is kept rigidly forward and movement about 37 is prevented by the tongue and its extension 25 which also remain in straight forward position. The rear pair of gangs cannot, therefore, slew to one side but, instead, remains in the exact desired alignment with the front pair of gangs. At the same time the connection is sufficiently flexible to allow the gangs to adapt themselves to the inequalities in the surface of the ground.

Figure 2:
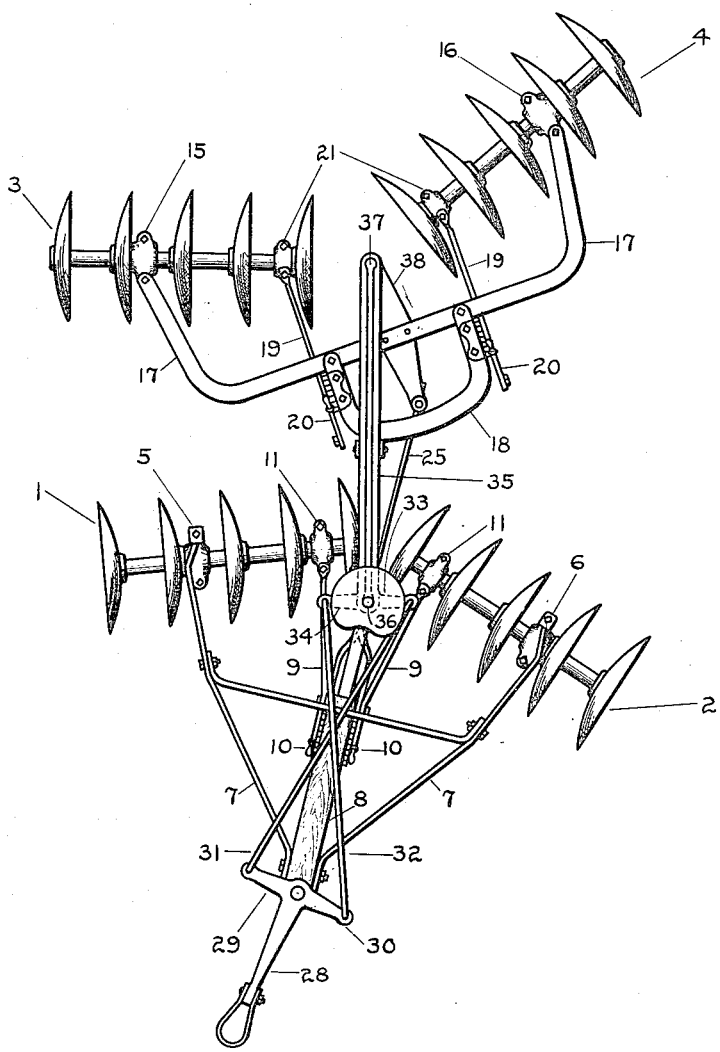
Figure 2 is a plan view of the harrow with the gangs in working position and with the harrow being turned.
Figure 3:
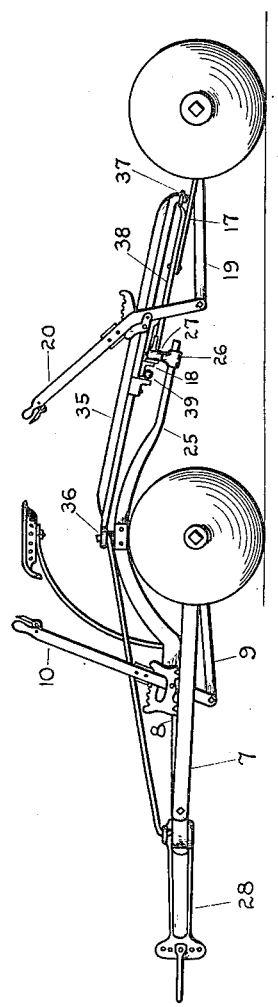
Figure 3 is a side view of the harrow with the gangs in transport position.
Figure 4:
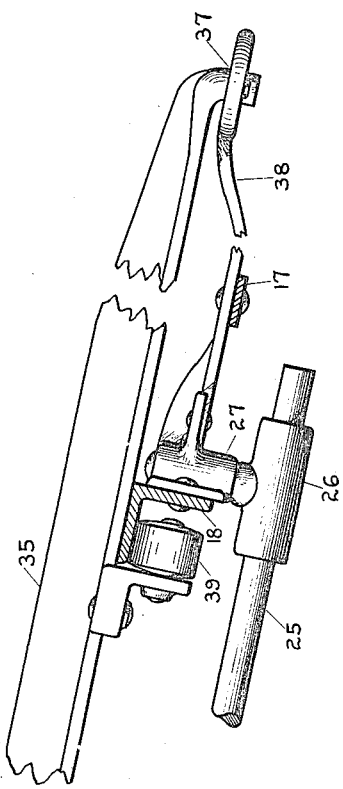
Figure 4 is a side view position of the connection to the rear pair of gangs.

When the harrow is turned, the parts assume the position shown in Figure 2. The front pair of gangs is guided around by the draft tongue and the frame 7. The rear pair of gangs is pulled around by the extension 25 of the draft tongue in such a manner as to cause the rear pair of gangs to trail the front pair of gangs and in this movement the rear pair of gangs is prevented from slewing or moving to one side and is positively caused to follow in the path directed by the tongue extension 25 by reason of the cross link connection and the link 35. In other words, as the harrow is turned in the direction shown in Figure 2, there is a push on link 31 and a pull on link 32 which swings the link 35 about the pivot 36. This motion is transmitted through the member 38 to the rear frame 17 causing its movement about the pivot 37 to be controlled so that the rear pair of gangs will follow in the exact desired alignment with the front pair.

It will be observed that, with this arrangement, the harrow will turn only as guided and will resist in any position the tendency to disturb the proper alignment of the gangs.

This construction also gives very desirable latitude for arrangement and adjustment of parts. In the construction of tandem disk harrows in which the rear pair of gangs is flexibly connected to the front pair, it is desirable that the connection between the front and rear sections be exactly midway between the active centers of rolling resistances of the front and rear sections. It is possible in the construction of this invention, to locate the sliding pivot 26 in such a position with respect to the longitudinal axis of the effective centers of the rolling resistances and, at the same time, it is possible by a relatively greater or less length of the arms 33 and 34 as compared with the arms 29 and 30 together with the proper positioning of the sliding pivot to correct any practical irregularities that are likely to arise.

It can be seen that a relatively simple construction has been provided which not only secures the proper flexibility between the sets of gangs of a double cut harrow but it also eliminates the uncertain trailing features of and provides a positive guiding means for insuring that the rear pair of gangs will trail the front pair in desired relation both when going forward and when turning.

It is to be understood that the construction shown is for purposes of illustration and that variations and changes may be made therein without departing from the nature or the scope of the invention as shown by the appended claims.

What I claim is:

1. A tandem disk harrow having a front pair of gangs, a rear pair of gangs, means flexibly connecting the pairs of gangs, a draft member movable in response to the direction of the application of the draft force for pulling the harrow so that the member is guided by the draft force, and means associated with said member for positively and rigidly maintaining the rear pair of gangs in operating alignment with the front pair of gangs.

2. A tandem disk harrow having a front pair of gangs, a rear pair of gangs, a movable draft device, and means connecting the gangs and connected with the draft device so that the pull on said device positively causes the rear pair of gangs to trail the front pair of gangs in the desired relation when the harrow is turned.

3. A tandem disk harrow having a front pair of gangs, a rear pair of gangs, a movable draft device, and means connecting the gangs and connected to the draft device permitting relative movement of the gangs about a longitudinal, horizontal axis and at the same time positively maintaining the gangs in rigid alignment.

4. A tandem disk harrow having a front pair of gangs, a rear pair of gangs, a movable draft device, and means for connecting the gangs and connected with the draft device so that movements of the draft device positively move the pairs of gangs to secure proper angular relation of the pairs of gangs to the line of draft, both when the harrow is moved straight forward and when it is turned.

5. A tandem disk harrow comprising a front pair of gangs, a rear pair of gangs, a draft device movable in response to guiding movements of the draft on the harrow, means flexibly connecting the pairs of gangs, and mechanism connected to the draft device and associated with the means connecting the gangs together for positively and automatically guiding the rear set of gangs to cause it to trail the front set of gangs both when the harrow is advancing forward and when it is turned.

6. A tandem disk harrow comprising a front pair of gangs, a rear pair of gangs, a draft device, and means connecting the gangs including portions permitting the rear set of gangs to move relative to the front set about both a longitudinal and a horizontal axis, but preventing substantial movement about a vertical axis except when turning when the connecting means positively moves the rear pair of gangs about a vertical axis relative to the front pair to cause the rear pair to trail the front pair.

7. A tandem disk harrow comprising a front pair of gangs, a rear pair of gangs, a draft tongue, a draft member pivoted to said tongue, a second draft member pivoted to said tongue and extending rearwardly and pivoted to the frame of the rear pair of gangs, a pair of cross links between said draft members, a swivel connection between the draft tongue and the rear pair of gangs, whereby the draft positively guides the rear pair of gangs relative to the front pair and maintains them in alignment both when advancing and when turning.

8. A tandem disk harrow having a front pair of gangs, a rear pair of gangs, a draft frame for the front gangs, flexible connections between the front pair of gangs and the rear pair of gangs, a draft member connected to the draft frame of the front gangs and movable in response to guiding movements of the draft on the harrow, and means associated with the draft member and the rear pair of gangs to positively and rigidly hold the rear gangs in proper operating alignment with the front pair of gangs when the harrow is being pulled straight forward and for positively and forcibly guiding the rear pair of gangs in proper trailing relation to the front pair of gangs when the harrow is being turned.

In testimony whereof, I affix my signature.

HARRY S. DICKINSON.